(12) United States Patent
West

(10) Patent No.: US 9,209,626 B2
(45) Date of Patent: Dec. 8, 2015

(54) PARALLELABLE THREE-PHASE PHOTOVOLTAIC POWER CONVERTER

(71) Applicant: Richard Travis West, Ragged Point, CA (US)

(72) Inventor: Richard Travis West, Ragged Point, CA (US)

(73) Assignee: RENEWABLE POWER CONVERSION, INC., San Luis Obispo, CA (US)

( * ) Notice: Subject to any disclaimer, the term of this patent is extended or adjusted under 35 U.S.C. 154(b) by 281 days.

(21) Appl. No.: 13/926,142

(22) Filed: Jun. 25, 2013

(65) Prior Publication Data

US 2014/0376293 A1  Dec. 25, 2014

(51) Int. Cl.
| | | |
|---|---|---|
| *H02M 7/44* | (2006.01) | |
| *H02J 3/38* | (2006.01) | |
| *H02M 1/12* | (2006.01) | |
| *H02M 7/487* | (2007.01) | |

(52) U.S. Cl.
CPC ................ *H02J 3/383* (2013.01); *H02M 1/126* (2013.01); *H02M 7/487* (2013.01)

(58) Field of Classification Search
CPC ........................................................ H02M 7/44
See application file for complete search history.

(56) References Cited

U.S. PATENT DOCUMENTS

| | | | | |
|---|---|---|---|---|
| 5,852,558 | A * | 12/1998 | Julian .................. | H02M 7/5387 363/132 |
| 7,145,268 | B2 * | 12/2006 | Edwards ............... | H02M 7/487 307/127 |
| 7,177,165 | B2 * | 2/2007 | Deng et al. ........... | 363/40 |
| 8,144,490 | B2 * | 3/2012 | El-Barbari ........... | H02M 7/487 323/906 |
| 2010/0019742 | A1 * | 1/2010 | Li et al. .......................... | 323/234 |
| 2010/0110742 | A1 * | 5/2010 | West .............................. | 363/132 |
| 2011/0128763 | A1 * | 6/2011 | Iwata et al. ..................... | 363/98 |
| 2011/0141786 | A1 * | 6/2011 | Shen ..................... | H02M 7/487 363/131 |
| 2014/0160818 | A1 * | 6/2014 | Garces et al. .................... | 363/97 |
| 2014/0334211 | A1 * | 11/2014 | Somani ............. | H02M 7/53875 363/131 |

* cited by examiner

*Primary Examiner* — Emily P Pham

(57) ABSTRACT

The invention is a bipolar solar photovoltaic to three-phase AC power converter with a novel non-isolated power conversion topology which allows multiple power converter outputs to be directly paralleled without the need for synchronized switching or galvanic isolation. The invention directly supports a new approach to solar photovoltaic system design wherein a large number of distributed lower power converters are used in lieu of one large central inverter.

2 Claims, 4 Drawing Sheets

FIGURE 1 – PRIOR ART

TYPICAL PRIOR ART SEMICONDUCTOR SWITCHING MATRIX

PARALLELABLE THREE-PHASE PHOTOVOLTAIC POWER CONVERTER

BACKGROUND OF THE INVENTION

In photovoltaic power systems with multiple DC to 3-phase power converters, it is often desirable to directly parallel power converter AC outputs. The most cost effective and efficient power converters utilize power conversion topologies which provide no galvanic isolation between grounded bipolar photovoltaic sources and an AC electrical grid connection. These power converter types all require output filter inductors and filter capacitors to integrate or filter pulse modulated waveforms into sinusoidal current waveforms. In prior art power converters, line filter capacitors are delta-configured. In order to directly parallel prior art power converters, the pulse modulated waveforms of each power converter must be synchronized. Asynchronous switching will cause currents to flow between the earth grounds of each power converter, power conversion efficiency will be degraded and electromagnetic interference will be generated. Another paralleling approach for prior art power converters, and one typically used in megawatt-scale photovoltaic inverters in lieu of synchronized switching, is to connect each inverter output to separate, isolated low-voltage windings of a medium-voltage distribution transformer.

BRIEF SUMMARY OF THE INVENTION

The invention is a photovoltaic inverter based on a novel non-isolated power conversion topology which allows any number of power converter outputs to be connected in parallel. Specifically, the preferred embodiment of the invention is a power converter with a three-level neutral point clamp (3LNPC) topology and AC output line filter capacitors connected in a Wye configuration with a common return to the DC neutral point. The advantages of this topology are ease of paralleling power converter outputs and reduction in the size of common mode output filters.

DETAILED DESCRIPTION OF THE INVENTION

Figure 1:
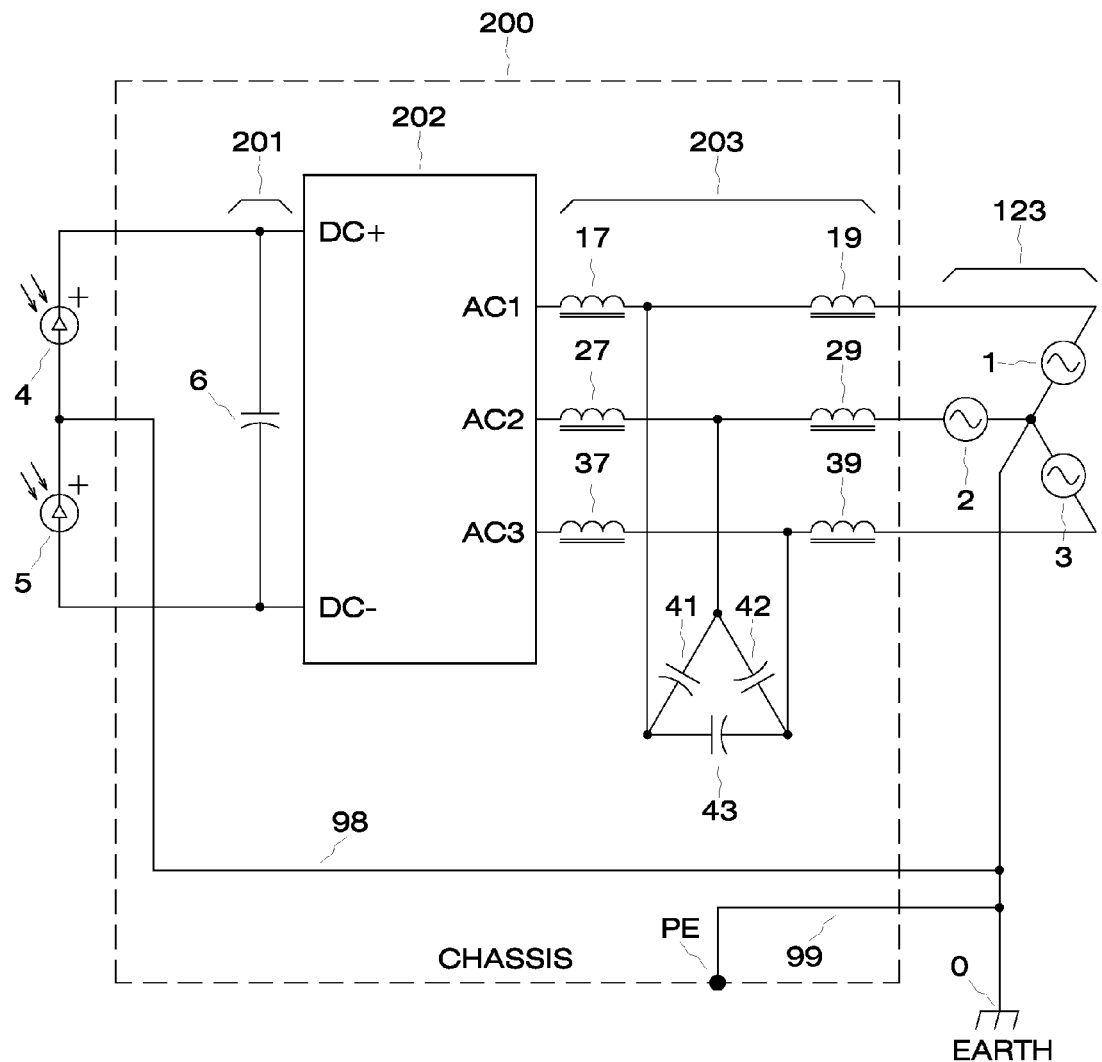
FIG. 1 is a basic electrical schematic for a prior art non-isolated, bipolar solar photovoltaic to three-phase power converter.

FIG. 1 shows prior art bipolar solar photovoltaic to three-phase power converter 200, bounded by the dashed line, connected between photovoltaic sources 4 and 5 and three-phase electrical grid 123. Power converter 200 is broken down into three functional parts; (i) capacitive DC bus 201 comprising capacitor 6, (ii) semiconductor switching matrix 202 and (iii) output filter network 203, comprising primary filter inductors 17, 27 and 37, filter capacitors 41, 42 and 43 and secondary filter inductors 19, 29 and 39. Capacitor 6 is used as an energy storage element to essentially convert the quasi-current-source characteristics of photovoltaic current sources 4 and 5 into a voltage source as seen by semiconductor switching matrix 202 at DC input terminals DC+ and DC−. Semiconductor switching matrix 202 is any arrangement of semiconductor switching devices that can support DC to 3-phase power conversion. Voltage waveforms at semiconductor switching matrix 202 output terminals AC1, AC2 and AC3 are pulse width modulated and swing between voltage potentials DC− and DC+. Output filter network 203 integrates the high-frequency waveforms at AC1, AC2 and AC3 to create substantially sinusoidal current waveforms synchronized with line-frequency electrical grid phase voltages 1, 2 and 3 to provide positive power transfer into utility grid 123. Primary filters 17, 27 and 37 provide high impedances at the switching matrix 202 switching frequency and much lower impedances at 50 Hz/60 Hz line frequencies. Capacitors 41, 42 and 43 provide low line-to-line impedances at the switching matrix 202 switching frequency and much higher impedances at 50 Hz/60 Hz line frequencies. Inductors 19, 29 and 39 provide secondary filtering to further attenuate the switching matrix 202 switching frequency and harmonics thereof. The common point of photovoltaic sources 4 and 5 is connected through conductor 98, the "white" grounded conductor with a direct connection to earth ground 0 at the source of electrical grid 123. Power converter equipment safety ground, PE, is bonded to the power converter chassis and connected by conductor 99, the "green" grounding conductor, to earth ground 0 at the source of electrical grid 123.

Figure 2:
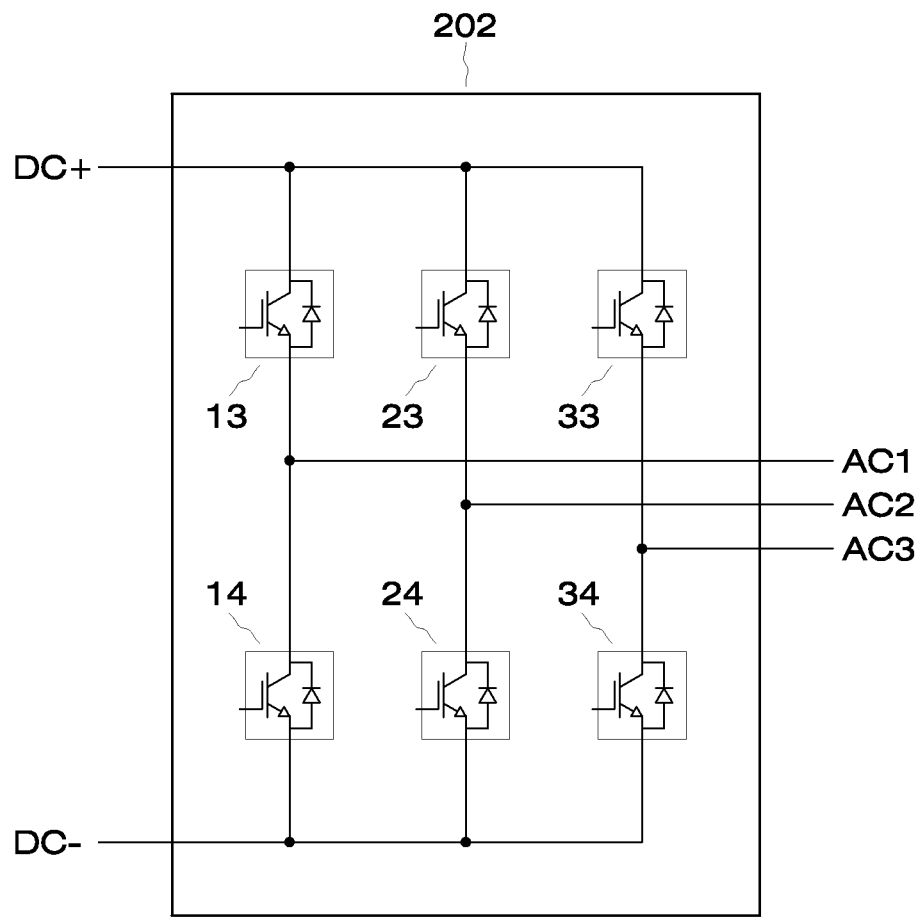
FIG. 2 is a detail of a common semiconductor switching matrix topology that could be used with the power converter illustrated in FIG. 1.

FIG. 2 shows a detail of element 202 in FIG. 1 and as a typical 6-pole, three-phase bridge topology with half bridge elements 13/14, 23/24 and 33/34 sourced from terminals DC+ and DC− and connected to AC1, AC2 and AC3, respectively. This power topology is a common prior-art photovoltaic switching matrix topology.

Figure 3:
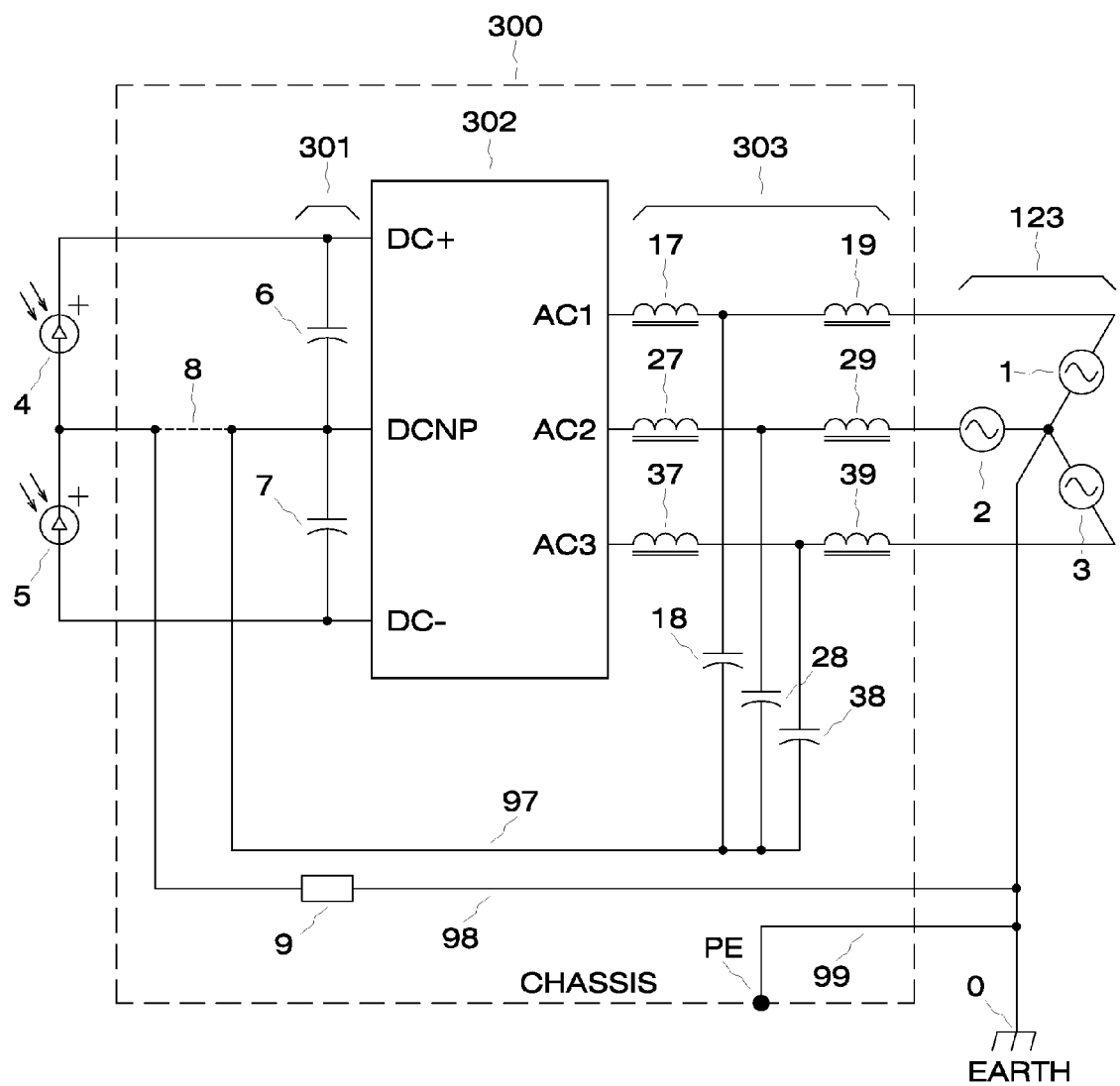
FIG. 3 is a basic electrical schematic for a bipolar solar photovoltaic to three-phase power converter according to the instant invention.

FIG. 3 shows the instant invention bipolar solar photovoltaic to three-phase power converter 300 bounded by the dashed line and connected between photovoltaic sources 4 and 5 and three-phase electrical grid 123. Power converter 300 is broken down into three functional parts; (i) capacitive DC bus 301 comprising capacitors 6 and 7, (ii) semiconductor switching matrix 302 and (iii) output filter network 303, comprising primary filter inductors 17, 27 and 37, filter capacitors 18, 28 and 38 and secondary filter inductors 19, 29 and 39. Capacitors 6 and 7 are used as energy storage elements to essentially convert the quasi-current-source characteristics of photovoltaic current sources 4 and 5 into a voltage source as seen by semiconductor switching matrix 302 at DC input terminals DC+ and DC−. Semiconductor switching matrix 302 is any arrangement of semiconductor switching devices that can support DC to 3-phase power conversion. Voltage waveforms at semiconductor switching matrix 302 output terminals AC1, AC2 and AC3 are pulse width modulated and swing between voltage potentials DC− and DC+. Output filter network 303 integrates the high-frequency waveforms at AC1, AC2 and AC3 to create substantially sinusoidal current waveforms synchronized with line-frequency utility grid phase voltages 1, 2 and 3 to provide positive power transfer into utility grid 123. The control algorithms required to regulate low distortion sinusoidal currents into a utility grid are known and are not within the scope of this invention. Primary filters 17, 27 and 37 provide high impedances at the switching matrix 302 switching frequency and much lower impedances at 50 Hz/60 Hz line frequencies. Capacitors 18, 28 and 38 provide low impedances returns to DC bus 301 at the switching matrix 302 switching frequency and much higher impedances at 50 Hz/60 Hz line frequencies. Inductors 19, 29 and 39 provide secondary filtering to further attenuate the switching matrix 302 switching frequency and harmonics thereof. A connection between DCNP and the common point of photovoltaic sources 4 and 5 may or may not be connected by jumper 8, depending on the application and power converter control method. When jumper 8 is not in place, third harmonic injection may be used to modulate the voltage at DCNP at three times the AC electrical grid frequency to provide more power conversion headroom. The common point of photovoltaic sources 4 and 5 is connected through conductor 98, the "white" grounded conductor with a direct connection to earth ground 0 at the source of electrical grid 123 or through grounding impedance 9. Power converter equipment safety ground and chassis bond, PE, is connected by conductor 99, the "green" grounding conductor to earth ground 0 at the source of electrical grid 123. The common capacitor line filter connection, 97, to the DC bus is shown to DC neutral point, DCNP, but could also be connected at DC− or DC+.

Figure 4:
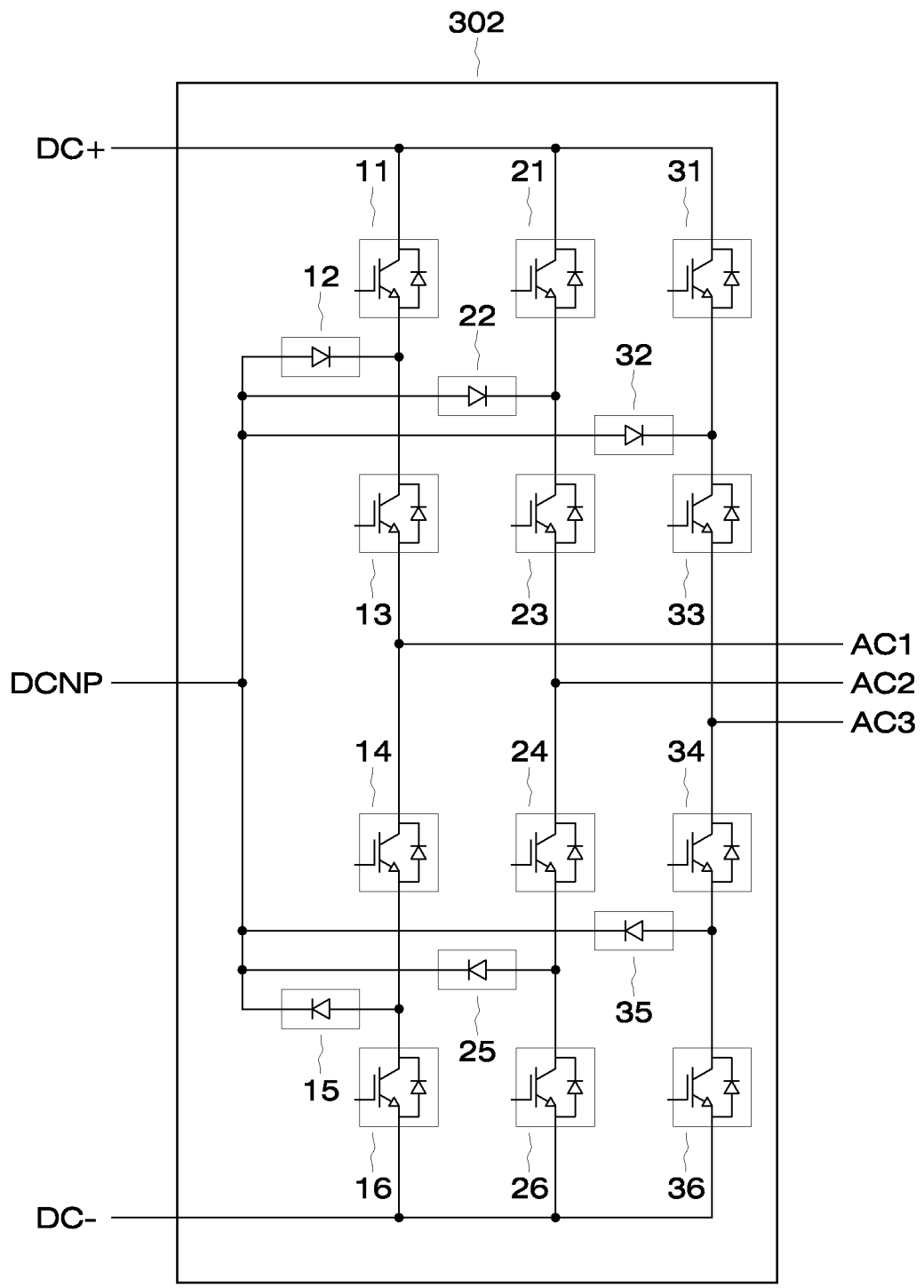
FIG. 4 is a detail of a preferred embodiment for a semiconductor switching matrix topology which could be used with the power converter illustrated in FIG. 3.

FIG. 4 shows a detail of element 302 in FIG. 3 as a preferred embodiment of the invention using a typical three level neutral point clamp (3LNPC) topology with half bridge elements 11-16, 21-26 and 31-36 sourced from terminals DC+ and DC− connected to AC1, AC2 and AC3, respectively. This 3LNPC power semiconductor switching matrix topology is known. The way in which this 3LNPC topology is used with a specific DC bus configuration and a specific output filter network is novel. The invention is not limited to use with a 3LNPC topology.

When the performance of the power converters in FIGS. 1 and 3 are compared, capacitors 41, 42 and 43 in FIG. 1 have a large, high frequency common mode voltage component with respect to earth ground whereas capacitors 18, 28 and 38 in FIG. 3 do not. In FIG. 1 each filter capacitor, 41, 42 and 43, "sees" 1.5 times the inductance of each of the individual filter inductors 17, 27 and 37 and the power converter works as a true three-phase system. In FIG. 3, each filter capacitor only works with and "sees" its associated filter inductor, therefore the power converter works as three single phase inverters working from a common DC bus. In FIG. 1 currents at the switching frequency and harmonics thereof are not returned to the DC bus, in FIG. 3 they are.

In its simplest form, the invention is a photovoltaic power converter with an output filter arrangement wherein high frequency switching currents are returned to the power converter DC buss. The invention effectively isolates circulating high-frequency currents to a given power converter. The utility of the invention is that it enables the outputs of any number of power converters to be paralleled without the need for internal or external galvanic isolation or synchronized switching. The invention directly supports a new approach to solar photovoltaic system design wherein a large number of distributed lower power converters are used in lieu of one large central inverter.

What I claim as my invention is:

1. An apparatus for converting DC power from a bipolar photovoltaic source to 3-phase AC power comprising a split capacitor DC bus coupled to a semiconductor switching matrix coupled to an output filter network
    wherein said split capacitor DC bus comprises two series-connected groups of capacitors with three terminals; (i) a DC neutral point and common coupling point (ii) a positive capacitor terminal and (iii) a negative capacitor terminal wherein the adjectives positive and negative each refer to a voltage potential with respect to said DC neutral point and
    wherein said semiconductor switching matrix comprises an arrangement of semiconductor switching elements, a positive DC input, a negative DC inputs and three AC outputs and
    wherein said output filter network comprises three inductive elements and three capacitive elements wherein a first terminal of each inductive element is coupled to a unique output of one of said three AC outputs of said semiconductor switching matrix and wherein a second terminal of each inductive element is coupled to a unique first terminal of one of said three capacitive elements and wherein a second terminal of each of said three capacitive elements is coupled to said split capacitor DC bus and
    wherein said semiconductor switching matrix is a three-phase, three-level neutral point clamp topology comprising a semiconductor arrangement which allows each of said three AC outputs to be switched between said positive capacitor terminal, said DC neutral point and said negative capacitor terminal.

2. A method for providing output paralleling capability for solar photovoltaic DC to three-phase power converters when using solar photovoltaic sources configured as a bipolar source, with respect to earth ground, wherein said power converter employs a three-level neutral point clamp power conversion wherein an LC line filter is used on each of three power converter output phases wherein said LC filter uses a series inductor and a shunt capacitor and wherein a high-frequency return path is provided from each power converter output phase through each shunt capacitor to a power converter capacitive DC input bus.

* * * * *